(No Model.)

J. F. SPRAIN.
AUTOMATIC FUNNEL.

No. 591,894.      Patented Oct. 19, 1897.

WITNESSES:
Frank S. Ober
Samuel M. Chesnut

INVENTOR
John Frederick Sprain
BY
Fowler & Fowler
ATTORNEYS

UNITED STATES PATENT OFFICE.

JOHN FREDERICK SPRAIN, OF BROOKLYN, NEW YORK, ASSIGNOR OF ONE-HALF TO ARTHUR R. PARSONS, OF NEW YORK, N. Y.

AUTOMATIC FUNNEL.

SPECIFICATION forming part of Letters Patent No. 591,894, dated October 19, 1897.

Application filed July 23, 1896. Serial No. 600,211. (No model.)

*To all whom it may concern:*

Be it known that I, JOHN FREDERICK SPRAIN, a citizen of the United States, residing at Brooklyn, Kings county, and State of New York, have invented certain new and useful Improvements in Automatic Funnels, of which the following is such a full, clear, and exact description as will enable any one skilled in the art to which it appertains to make and use the same, reference being had to the accompanying drawings, forming part of this specification.

My invention relates to a funnel designed automatically to stop discharging the liquid into a vessel that is being filled upon the liquid reaching a given height in said vessel; and the invention consists in the various novel and peculiar arrangements and combinations of the several parts of the device, all as hereinafter fully described, and then pointed out in the claims.

I have illustrated types of my invention in the accompanying drawings, wherein—

Figure 1:
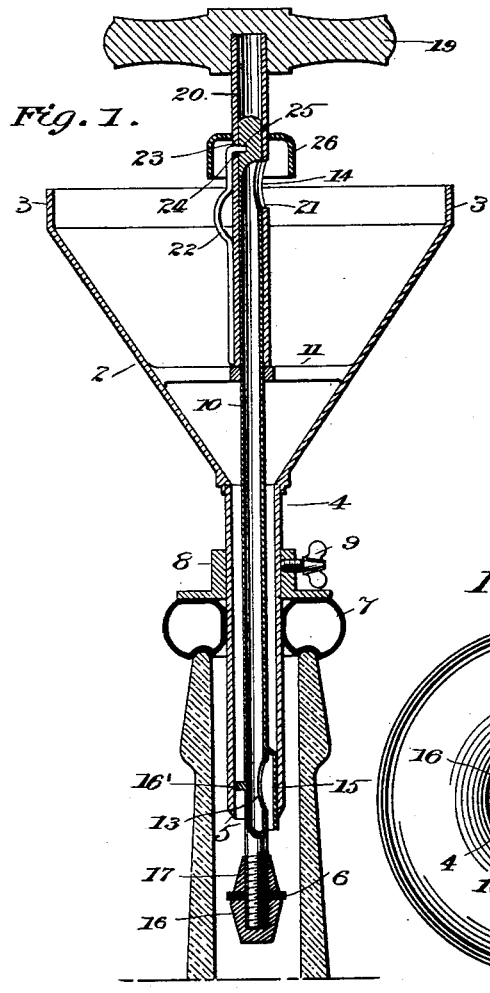
Figure 2:
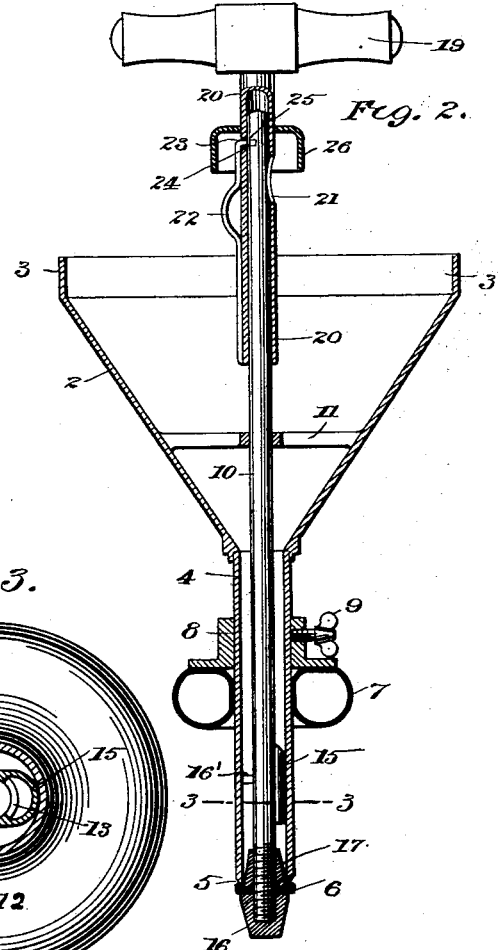
Figure 3:
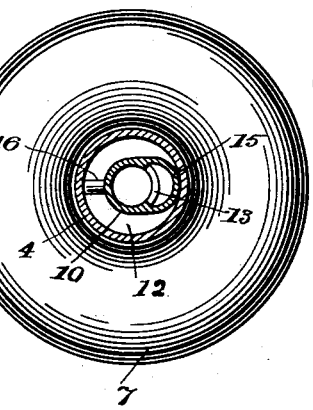
Figure 4:
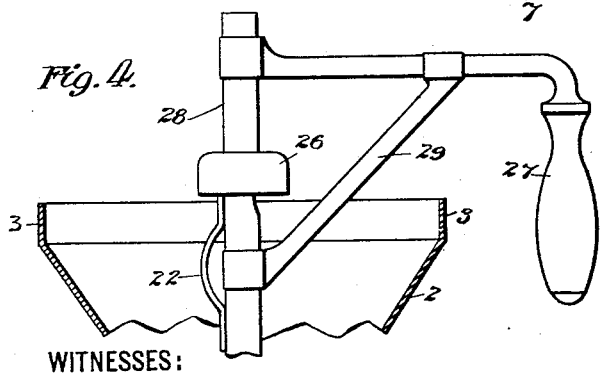
Figure 5:
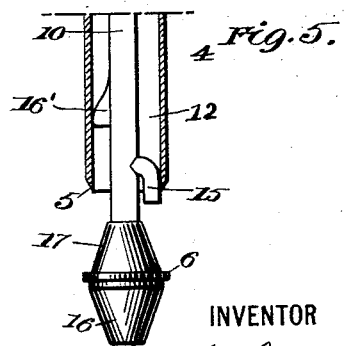

Figure 1 is a view of my improved funnel in section on a vertical plane extending through the axis of the funnel and the centrally-located air-tube. In this view is also shown in vertical section the neck of a bottle, within which the funnel is mounted in open position ready to discharge liquid therefrom into the bottle and to fill it to a predetermined height, as will be hereinafter described. Fig. 2 is a view of my improved funnel in section on a plane taken vertically through the center of the funnel with the air-tube and the upper portion of the handle shown in full. In this view the funnel is in closed position and is supposed to be suspended by the handle, under which condition it is closed, so as to retain within it the liquid that may be left standing therein after the operation of the funnel is automatically stopped. Fig. 3 is an enlarged view in section taken on a plane indicated by line 3 3, Fig. 2, and with the funnel body and handle omitted. Fig. 4 is a side view of a modified form of handle, and Fig. 5 is a view of the lower end of the air-tube and spout and shows a modified form of the shield for the inlet-opening of the air-tube.

Referring to the drawings, in which like numbers of reference indicate like parts throughout, 2 is the funnel-body of the ordinary cone shape and with its upper end formed cylindrically, as at 3, though it may assume any desirable shape and be made of any suitable material.

4 is the spout projecting from the funnel-body and is shown as a straight cylindrical tube of uniform diameter and is preferably seamless. The end of the spout is formed with a bevel 5, so as to bring it to a sharp edge to more thoroughly embed itself in the soft material of the washer 6, which is carried by the stop on the lower end of the air-tube, which is hereinafter described.

Upon the exterior of the funnel-spout I adjustably mount a pneumatic or permanently-inflated body 7, which in the present form consists in a ring of soft rubber which will readily yield under the weight of the device when inserted in the mouth of a vessel, as shown in Fig. 3. This inflated body or washer is fitted snugly to the funnel, and I prefer to have it sufficiently large to overhang the mouth of the vessel to be filled, in order that it may more perfectly seal the space between the mouth of the vessel and the funnel, as it is designed to do. This pneumatic body is adjustable lengthwise of the funnel, so that the distance which the funnel projects into the vessel may be regulated by raising or lowering the pneumatic body on the funnel, and the height to which the vessel is to be filled may accordingly be regulated predeterminately, as will be more fully understood hereinafter. In the present construction the pneumatic ring 7 is held upon the funnel-spout by friction and a collar or holder 8, provided with a set-screw 9, is arranged above it upon the spout for the purpose of adjusting it, which adjustment may be accomplished by loosening the set-screw, then raising or lowering the collar, as may be required, tightening the screw again, and moving the pneumatic ring into contact with it. When the funnel is set in the mouth of the vessel, the entire weight of the device is thrown upon the pneumatic washer or ring 7, as shown in Fig. 3, and as this body is in intimate contact with the exterior of the funnel-spout and the mouth of the vessel the superimposed weight will cause it to seek all the inequalities in the surface of either part and will press the body into such firm contact as to form a perfect air seal, and thereby render the funnel all the more efficient in its automatic operation. It will also readily fit in an irregularly-shaped mouth of a vessel. This pneumatic ring 7 may assume any desired form, though the one shown is a commodity found on the market, and, if preferred, the ring may be fixidly attached to the collar above it. If preferred, instead of having a set-screw to hold the collar in adjusted position, the collar may be formed with an interior screw-thread fitting a corresponding thread upon the exterior of the spout, and the collar may be screwed along the spout into adjustment.

10 is the air-tube, which is loosely mounted in a guide or bridge-piece 11, located within the funnel-body so as to extend centrally through the funnel-spout 4 and project slightly below the same. This air-tube has a limited vertical play or endwise movement and is centered within the spout, so that there is constituted between the exterior of the tube and the interior of the spout an annular discharge-passage 12 for the fluid to flow from the body through the spout into the vessel. Near the lower end of the air-tube is formed a lateral inlet-orifice 13 for permitting the air which is displaced by the incoming fluid to flow from the vessel, thence to the interior of the air-tube, from where it is discharged at the upper end through a similar opening 14.

Upon the exterior of the air-tube and adjacent the inlet 13 is mounted a shield or piece 15, which extends downwardly over the inlet and serves to prevent the downflowing fluid from being sucked into the same and thereby carried out with the air-current. This shield may extend part or all the way over the opening and in effect is a branch pipe which, in fact, is the form I employ with large funnels, as shown in Fig. 5. Experience has proved that the best result is obtained when this covering or branch is carried downward, as the liquid is sharply diverted and caused to flow away smoothly from the air-inlet, and I also prefer to have the lower end of the shield or branch come on about a level with the end of the spout when the funnel is open, as indicated in Fig. 1. I also find it better to have the shield or branch 13 lie against the interior of the spout, and I accordingly provide a projection or piece 16' upon the opposite side of the tube from where the shield is located, which piece serves to keep the shield or branch 15 against the wall of the spout and at the same time maintains the air-tube centrally of the spout.

Upon the lower end of the air-tube is screwed a stop 16, the exterior of which is shaped like an inverted truncated cone in order to permit the device to be more readily inserted in the mouth of the vessel. The stop 16 carries a washer 6 of soft material and is of sufficiently greater diameter than the interior of the spout to permit the spout to rest firmly upon the same when the device is suspended by the air-tube, as shown in Fig. 2. Above the stop 16 and its washer is arranged a downwardly-flaring collar 17, which is also screwed in place upon the rod, and the tapering shape of this piece, as will be clearly understood from Fig. 5, serves to evenly shed the liquid as it is discharged from the end of the spout and prevents the liquid from falling upon the entire upper surface of the washer and causing a rebound of the same, which would interfere with the free escape of the displaced air. The tapered shape of this piece 17, which fits within the spout, also serves to center the stop upon the lower end of the spout when it is moved upwardly and seated against the same. This stop may be made of any suitable material—such, for instance, as hard rubber—and the washer 6 may be made of soft material, so that when it closes upon the end of the spout the beveled end thereof will sink into it, as shown in Fig. 2, and thereby completely cut off the passage of the liquid from the spout when the device is lifted by the upper end of the air-tube, as will be described farther on.

The upper end of the air-tube is provided with a removable handle comprising a handpiece 19, having a tubular extension 20, adapted to fit over the end of the air-tube 10 and rest with its lower end upon the guide or bridge 11, and thereby support the tube at its lower limit of movement, the upper limit of the vertical play of the tube being determined by the stop 16 taking against the end of the spout. This tubular piece 20 of the handle is made of proper length to give the tube a sufficient range of vertical movement, and it is provided with a lateral opening 21, adapted to register with the opening 14 of the air-tube and through which the displaced air coming up the tube escapes to the outer air. The handle is locked to the tube by means of a spring finger-piece 22, which is secured by one of its ends to the exterior of the extension and has its outer end bent, as at 23, so as to take into the hole 24 in the tubular extension and a notch 25 in the tube. These parts are so related that when the spring-latch has locked the parts together the two openings 14 and 21 are in registration with each other, so as to place the tube in communication with the outer air.

The outlet 14 of the air-tube is provided with a deflector 26, which consists in a collar having a depending flange coming down partially over the opening, and this is placed upon the exterior of the tubular extension of the handle and in such position as to deflect into the funnel-body any liquid that may be carried out of the tube by the outgoing stream of air. In some cases it may be preferable to use a handle that projects over to the side of the funnel-body instead of one that stands directly above the same, as in Figs. 1 and 2. This I provide for as shown in Fig. 4, wherein the handle 27 is bent L-shaped, with the main portion thereof arranged horizontally and attached to the tubular piece or sleeve 28, which is fitted upon and locked to the air-tube in the same way as the tubular extension 20 in the other figures. The horizontal part is also connected with the sleeve 28 by an inclined brace 29 to give the same a firm support. These handles are readily interchangeable, so that if it is desired to use a laterally-projecting handle instead of the other they may be readily interchanged.

From the foregoing description the operation and use of the device will be readily understood. As the pneumatic ring 7 cuts off the communication between the outer air and interior of the vessel, when the funnel is applied thereto, as shown in Fig. 1, the liquid poured into the body of the funnel will flow through the spout around the air-tube into the vessel, the contained air in which will find its way through the inlet 13 via the air-tube and the outlet 14 to the outer air. The liquid will continue to flow in and the air to pass out by these routes, respectively, until the level of the liquid reaches the branch or shield 15 covering the air-inlet 13, whereupon the flow of both will cease automatically and leave a quantity of the liquid standing in the funnel. The funnel may then be removed by lifting it by the handle carried by the air-tube, and this operation will lift the tube vertically and bring the stop 16 with its washer up against the end of the spout and the continued lifting movement will then raise the entire device from the mouth of the vessel, so that the device may be readily transferred to another vessel with the contents remaining in funnel and prevented from leaking therefrom by the closure of the stop against the spout. When the funnel is thus transferred to another vessel and mounted therein, the dropping down of the air-tube will discharge the liquid carried in the funnel into the other vessel and the filling of it will continue in the same way. It will be noted that by virtue of having the air-inlet at the lower end of the air-tube opening at a point above the stop 16, which cuts off the liquid-passage, any liquid that may be sucked into the air-tube will be retained therein and will not drop out while the funnel is being transferred and this is obviously an important advantage.

I desire it to be understood that I do not limit myself to the particular construction of parts herein set forth, as various modifications may be made in the same without departing from the spirit of the invention.

Having thus described my invention, what I claim, and desire to secure by Letters Patent, is—

1. The combination of a funnel, an air-tube for leading off the air displaced by the liquid in filling a vessel, the said tube being provided at its upper end with an outlet and at its lower end with a lateral inlet-orifice provided with a shield for diverting the inflowing liquid from said orifice and permitting a free inflow of the displaced air into said tube.

2. The combination of a funnel, an endwise-movable gravity air-tube mounted therein and extending through the funnel-spout, means for limiting the endwise movement of the air-tube in each direction and means for cutting off the passage for the fluid through the spout when said air-tube is at its limit of upward movement, said air-tube being provided at its upper end with an outlet and provided with an inlet near its lower end at a point above the means for cutting off the said passage for the liquid through the spout, said air-tube normally standing at its lower limit of movement and adapted to be drawn up as the funnel is lifted whereby the fluid-passage and air-inlet may be simultaneously shut off.

3. The combination of a funnel, an endwise-movable air-tube mounted therein extending through the funnel-spout, said air-tube being provided at its upper end with an outlet and provided near its lower end with a lateral inlet-opening and a depending piece or shield projecting from the exterior of the tube over said inlet for diverting the downflowing liquid from the inlet.

4. The combination of a funnel, an air-tube mounted therein extending through the funnel-spout, said air-tube being provided at its upper end with an outlet and provided near its lower end with a lateral inlet-opening, a depending piece or shield projecting from the exterior of the tube over said inlet for diverting the downflowing liquid from the inlet and a piece interposed between the exterior of the air-tube and the interior of the spout at a point substantially opposite the said shield.

5. The combination of a funnel, an endwise-movable air-tube 10 mounted therein and extending through the funnel-spout and provided with means for limiting its downward movement, a stop mounted upon the lower end of said air-tube and of a larger diameter than the interior thereof, a washer 6 of soft material mounted upon said stop for engaging the lower end of the spout when the air-tube is drawn up, a downwardly-flaring piece 17 surrounding said tube above said washer and having its largest diameter about equal to that of the interior of said spout, whereby as the air-tube is drawn up, said piece by entering the spout may gradually stop the flow of liquid before the washer is seated against the spout, substantially as and for the purpose set forth.

6. The combination of a funnel, an endwise-movable air-tube 10 mounted therein and extending through the funnel-spout and provided with means for limiting its downward movement, a downwardly-tapering stop 16 mounted upon the lower end of said air-tube and having its upper end of greater diameter than the interior of said tube, a washer 6 of soft material mounted upon the upper end of said stop 16 for closing against the end of the spout, a downwardly-flaring piece 17 arranged above said washer for taking in the end of said spout, substantially as and for the purpose set forth.

7. The combination of a funnel, an endwise-movable air-tube mounted in the funnel and extending through the funnel-spout and provided with means for limiting its upward movement, a guide or bridge-piece for said tube, a detachable handle mounted upon the upper end of the air-tube and provided with an extension adapted to engage with said guide or bridge-piece for limiting the downward movement of the air-tube.

8. The combination of a funnel, an endwise-movable air-tube mounted in the funnel and extending through the funnel-spout and provided with means for limiting its upward and downward movements, a detachable handle having a tubular extension fitting over the upper end of the air-tube and means for locking the two together.

9. The combination of a funnel, an endwise-movable air-tube mounted in the funnel and extending through the funnel-spout and provided with means for limiting its upward and downward movements, said air-tube being provided at its upper end with a lateral outlet-opening, a removable handle having a tubular extension adapted to fit over the upper end of said air-tube and provided with a lateral opening adapted to register with the said outlet-opening of the air-tube, and a spring-latch for locking the handle to the air-tube when the two said openings are brought into registration.

10. The combination of a funnel, an air-tube mounted within the funnel and having at its upper end a lateral outlet-opening, a detachable handle provided with a tubular extension adapted to fit over the upper end of said air-tube and provided with a lateral opening adapted to register with the outlet of said air-tube, means for locking the handle to said tube, and a deflector mounted upon said tube adjacent to the lateral opening therein for returning the fluid to the funnel-body.

In testimony whereof I have hereunto set my hand, this 22d day of July, 1896, in the presence of the two subscribing witnesses.

JOHN FREDERICK SPRAIN.

Witnesses:
A. M. HAYES,
WILLIS FOWLER.